United States Patent
An

(10) Patent No.: US 9,300,797 B2
(45) Date of Patent: Mar. 29, 2016

(54) METHOD AND TERMINAL FOR SPEED DIALING

(71) Applicant: ZTE CORPORATION, Shenzhen, Guangdong (CN)

(72) Inventor: Changhua An, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/391,756

(22) PCT Filed: Jul. 10, 2013

(86) PCT No.: PCT/CN2013/079102
§ 371 (c)(1),
(2) Date: Oct. 10, 2014

(87) PCT Pub. No.: WO2013/185663
PCT Pub. Date: Dec. 19, 2013

(65) Prior Publication Data
US 2015/0111545 A1    Apr. 23, 2015

(30) Foreign Application Priority Data
Jul. 13, 2012 (CN) .......................... 2012 1 0243162

(51) Int. Cl.
*H04M 3/42* (2006.01)
*H04M 3/44* (2006.01)
*H04M 1/2745* (2006.01)

(52) U.S. Cl.
CPC .......... *H04M 3/44* (2013.01); *H04M 1/274558* (2013.01); *H04M 1/274508* (2013.01)

(58) Field of Classification Search
CPC ..................................................... H04W 8/18
USPC ...................................................... 455/414.1
See application file for complete search history.

(56) References Cited

U.S. PATENT DOCUMENTS

2004/0224717 A1* 11/2004 Hertzberg et al. .......... 455/550.1
2005/0083899 A1*  4/2005 Babbar et al. ................ 370/342

(Continued)

FOREIGN PATENT DOCUMENTS

CN    101287203    10/2008
CN    102780802    11/2012

(Continued)

OTHER PUBLICATIONS

International Search Report for PCT/CN2013/079102, English translation attached to original, Both completed by the Chinese Patent Office on Sep. 25, 2013, All together 7 Pages.
Extended European Search Report for European Application No. 13805183.4, Completed by the European Patent Office, Dated Apr. 21, 2015, 7 Pages.

*Primary Examiner* — Santiago Garcia
(74) *Attorney, Agent, or Firm* — Brooks Kushman P.C.

(57) ABSTRACT

A method and terminal for speed dialing are disclosed. The method includes a terminal configuring pattern information of dialing, and establishing a correspondence between the pattern information and a contact person, wherein the pattern information comprises a letter key corresponding to a pattern name, a format of a pattern, and a combination mode among multiple patterns. The method further includes the terminal receiving key information input by a user, determining whether the input first key information is a number or a letter, if a letter, looking up an address book of the terminal according to the input key information to determine whether there is a contact person who satisfies a matching condition of the pattern information and, if yes, displaying the contact person who satisfies the matching condition of the pattern information on a terminal interface to be selected by the user for speed dialing.

8 Claims, 2 Drawing Sheets

(56) References Cited

U.S. PATENT DOCUMENTS

| | | | |
|---|---|---|---|
| 2005/0190196 A1* | 9/2005 | O'Neil et al. | 345/589 |
| 2009/0219176 A1* | 9/2009 | Ladouceur et al. | 341/22 |
| 2010/0311396 A1* | 12/2010 | Kim et al. | 455/414.1 |
| 2012/0028577 A1* | 2/2012 | Rodriguez et al. | 455/41.1 |
| 2012/0063585 A1* | 3/2012 | Gravino et al. | 379/218.01 |
| 2013/0086481 A1* | 4/2013 | Balasaygun et al. | 715/745 |
| 2015/0058017 A1* | 2/2015 | Singh et al. | 704/249 |

FOREIGN PATENT DOCUMENTS

| | | |
|---|---|---|
| EP | 1487184 | 12/2004 |
| KR | 20080111271 | 12/2008 |
| WO | 03041371 | 5/2003 |

* cited by examiner

METHOD AND TERMINAL FOR SPEED DIALING

CROSS-REFERENCE TO RELATED APPLICATION

This application is the U.S. national phase of PCT Appln. No. PCT/CN2013/079102 filed Jul. 10, 2013 which claims priority to Chinese Application No. 201210243162.9 filed Jul. 13, 2012, the disclosures of which are incorporated in their entirety by reference herein.

TECHNICAL FIELD

The patent document relates to the field of communications, and in particular, to a method and terminal for speed dialing.

BACKGROUND OF THE RELATED ART

In current fast-paced works and lives, the mobile phone has become an indispensable tool. People can keep in touch with and always communicate with relatives and friends in different regions with the phone. Therefore, an action of dialing often needs to be performed. At present, there are following several primary dial modes:

1. Complete dialing through a dialer. This is a relatively commonly-used dial mode, with a premise that a user wants to know a complete phone number of a contact person. However, when there are a number of contact persons, in order to remember numbers of all contact persons, it is obviously a less realistic idea.

2. Part number dialing. This is an improvement in the previous dial mode. A typical mode is a group number or a short number, which is generally a number plus last four digits of a phone number. Thus, fewer numbers are input indeed during dialing via the dialer. However, there is a problem that the user must remember the contents of short number, and the contents are also some meaningless numbers. Therefore, there is still considerable difficulty in remembering all contents. In fact, the difficulty for the user to exactly remember the numbers is almost the same as the difficulty to remember the whole phone number.

3. Dialing through an address book. This is the most practical dial mode at present, which comprises firstly finding a contact person by entering an address book, then clicking on a dialing key under a contact person, thereby completing dialing. The advantage of this mode is obvious, i.e., the number of the other party can be dialed as long as the name of the contact person is known. The disadvantage is that the operation is relatively complex, i.e., it may need to spend some time to firstly enter an address book and then find a contact person from the address book. Especially when it needs to find a certain contact person urgently, the user experience is not good.

Therefore, there is an urgent need to propose a simple and quick method for speed dialing, to save user's time, rapidly dial a phone number needed to be called by a user, and bring convenience to the majority of users, thereby improving the effect of user experience.

SUMMARY OF THE INVENTION

The embodiments of the present invention provide a method and a terminal for speed dialing, to save user's time and rapidly dial a phone number needed to be called by the user, thereby improving the user experience.

The embodiments of the present invention provide a method for speed dialing, comprising:

a terminal configuring pattern information of dialing, and establishing a correspondence between the pattern information and a contact person, wherein the pattern information comprises a letter key corresponding to a pattern name, a format of a pattern, and a combination mode among a plurality of patterns;

the terminal receiving key information input by a user, and determining whether the input first key information is a number or a letter; and if it is a letter, looking up an address book of the terminal according to the input key information to determine whether there is a contact person who satisfies a matching condition of the pattern information, and if yes, displaying the contact person who satisfies the matching condition of the pattern information on a terminal interface to be selected by the user for speed dialing.

Alternatively, the pattern name is a contact person attribute, and the pattern name corresponds to the letter key;

the format of the pattern is the pattern name plus pattern content, and the number of digits occupied by the pattern name and pattern content; and the combination mode among the plurality of patterns comprises any combination among various contact person attribute patterns.

Alternatively, the step of the terminal looking up an address book of the terminal according to the input key information to determine whether there is a contact person who satisfies a matching condition of the pattern information comprises:

the terminal determining a pattern corresponding to an input first letter and the format of the pattern according to the input first letter, and looking up the address book of the terminal in turn according to the input key information in accordance with the format of the pattern to determine whether there is a matched contact person.

Alternatively, the step of the terminal displaying the contact person who satisfies the matching condition of the pattern information on a terminal interface comprises:

when there are a plurality of contact persons in the address book of the terminal who satisfy the matching condition of the pattern information, the terminal displaying the plurality of contact persons in turn on the terminal interface.

Alternatively, the step of the terminal displaying the contact person who satisfies the matching condition of the pattern information on a terminal interface comprises:

when the input key information comprises a combination mode among a plurality of patterns but contact persons in the address book of the terminal do not satisfy all the matching conditions of the pattern information, the terminal only displaying contact persons who satisfy a matching condition of the pattern information on the terminal interface.

Alternatively, the step of the terminal looking up an address book of the terminal according to the input key information to determine whether there is a contact person who satisfies a matching condition of the pattern information comprises:

when the input key information comprises a combination mode of two patterns, the terminal determining a first pattern corresponding to an input first letter and a format of the first pattern according to the letter, and looking up an address book of the terminal in turn according to the input key information in accordance with the format of the first pattern to determine whether there is a matched contact person; and after determining that the key input of the first pattern ends according to the number of digits included in the format of the first pattern, the terminal determining a second pattern corresponding to a subsequently input first letter and a format of the second pattern according to the letter, and looking up the address book of the terminal in turn in accordance with the format of the second pattern to determine whether there is a matched contact person.

The embodiments of the present invention further provide a terminal for speed dialing, comprising: a configuration module, a full keyboard dialer, and a dial-up parsing module, wherein, the configuration module is configured to configure pattern information of dialing, and establish a correspondence between the pattern information and a contact person, wherein the pattern information comprises a letter key corresponding to a pattern name, a format of a pattern, and a combination mode among a plurality of patterns;

the full keyboard dialer is configured to receive key information input by a user, and transmit the key information to the dial-up parsing module; and the dial-up parsing module is configured to determine whether the input first key information is a number or a letter after receiving the key information transmitted by the full keyboard dialer; and if it is a letter, look up an address book of the terminal according to the input key information to determine whether there is a contact person who satisfies a matching condition of the pattern information, and if yes, display the contact person who satisfies the matching condition of the pattern information on a terminal interface to be selected by the user for speed dialing.

Alternatively, the pattern name is a contact person attribute, and the pattern name corresponds to the letter key;

the format of the pattern is the pattern name plus pattern content, and the number of digits occupied by the pattern name and pattern content; and the combination mode among the plurality of patterns comprises any combination among various contact person attribute patterns.

Alternatively, the dial-up parsing module is configured to look up an address book of the terminal according to the input key information to determine whether there is a contact person who satisfies a matching condition of the pattern information by the following mode:

determining a pattern corresponding to an input first letter and the format of the pattern according to the input first letter, and looking up the address book of the terminal in turn according to the input key information in accordance with the format of the pattern to determine whether there is a matched contact person.

Alternatively, the dial-up parsing module is configured to display the contact person who satisfies the matching condition of the pattern information on a terminal interface by the following mode:

when there are a plurality of contact persons in the address book of the terminal who satisfy the matching condition of the pattern information, displaying the plurality of contact persons in turn on the terminal interface.

Alternatively, the dial-up parsing module is configured to display the contact person who satisfies the matching condition of the pattern information on a terminal interface by the following mode:

when the input key information comprises a combination mode among a plurality of patterns but contact persons in the address book of the terminal do not satisfy all the matching conditions of the pattern information, only displaying contact persons who satisfy a matching condition of the pattern information on the terminal interface.

Alternatively, the dial-up parsing module is configured to look up an address book of the terminal according to the input key information to determine whether there is a contact person who satisfies a matching condition of the pattern information by the following mode:

when the input key information comprises a combination mode of two patterns, determining a first pattern corresponding to an input first letter and a format of the first pattern according to the letter, and looking up an address book of the terminal in turn according to the input key information in accordance with the format of the first pattern to determine whether there is a matched contact person; and after determining that the key input of the first pattern ends according to the number of digits included in the format of the first pattern, determining a second pattern corresponding to a subsequently input first letter and a format of the second pattern according to the letter, and looking up the address book of the terminal in turn in accordance with the format of the second pattern to determine whether there is a matched contact person.

With the method and terminal for speed dialing according to the embodiments of the present invention, it can save user's time and rapidly dial a call which a user needs to make by finding a matched contact person directly through key information input by the user, thereby improving the user experience.

PREFERRED EMBODIMENTS OF THE PRESENT INVENTION

The embodiments of the present invention will be illustrated in detail hereinafter in conjunction with accompanying drawings. It should be illustrated that, in the case of no conflict, the embodiments of the application and the features in the embodiments could be combined randomly with each other.

Embodiment One

Figure 1:
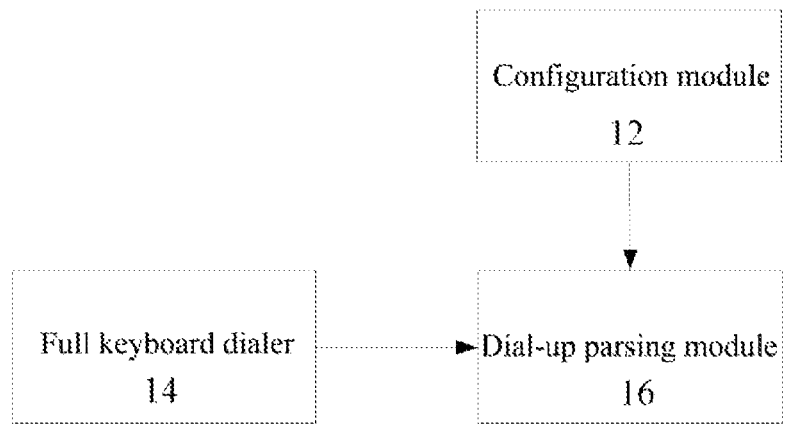
FIG. 1 is a structural diagram of a terminal according to embodiment one of the present invention.

As shown in FIG. 1, the present embodiment provides a terminal, which is a terminal with full keyboard or an intelligent terminal. That is, the keyboard of the terminal is a full keyboard. The full keyboard is a dial pad which can not only receive input of number keys, but also can receive input of letter keys. The terminal includes a configuration module 12, a full keyboard dialer 14 and a dial-up parsing module 16.

The configuration module 12 is configured to configure pattern information of dialing, and establish a correspondence between the pattern information and a contact person, wherein the pattern information comprises a letter key corresponding to a pattern name, a format of a pattern, and a combination mode among a plurality of patterns;

the pattern name is a contact person attribute, for example, the name of contact person, a company, a school, and a birthday etc., and the pattern name corresponds to the letter key, for example, the company corresponds to a letter key O, the school corresponds to a letter key S, and the birthday corresponds to a letter key B etc.

The format of the pattern is the pattern name plus pattern content, and the number of digits occupied by the pattern name and pattern content. For example, for the Lenovo Company, the format of the pattern of the company is Olx (case Insensitive), and the number of digits occupied by it is 3.

The combination mode among the plurality of patterns comprises any combination among various contact person attribute patterns, for example, a company plus the name of contact person, a birthday plus the name of contact person etc.

In an example of an application, the system will provide several combinations by default. A user may set the letters and number of digits corresponding to the combinations by himself or herself, and additionally, the user may further add some possible combination modes by himself or herself, which are believed by user, to perform the speed dialing.

The full keyboard dialer 14 is configured to receive key information input by a user, and transmit the key information to the dial-up parsing module 16;

The full keyboard dialer 14 supports input of English letter keys and number keys at the same time.

The dial-up parsing module 16 is configured to determine whether the input first key information is a number or a letter after receiving the key information transmitted by the full keyboard dialer 14; and if it is a letter, look up an address book of the terminal according to the input key information in accordance with the pattern information to determine whether there is a contact person who satisfies a matching condition of the pattern information, and if yes, display the contact person who satisfies the matching condition of the pattern information on a terminal interface to be selected by the user for speed dialing.

Wherein, the dial-up parsing module 16 is configured to look up an address book of the terminal according to the input key information to determine whether there is a contact person who satisfies a matching condition of the pattern information by the following mode:

determining a pattern corresponding to an input first letter and the format of the pattern according to the letter, and looking up the address book of the terminal in turn according to the input key information in accordance with the format of the pattern to determine whether there is a matched contact person.

Wherein, the dial-up parsing module 16 is configured to look up an address book of the terminal according to the input key information to determine whether there is a contact person who satisfies a matching condition of the pattern information by the following mode:

when the input key information comprises a combination mode of two patterns, determining a first pattern corresponding to an input first letter and a format of the first pattern according to the letter, and looking up in an address book of the terminal in turn according to the input key information in accordance with the format of the first pattern to determine whether there is a matched contact person; and after determining that the key input of the first pattern ends according to the number of digits included in the format of the first pattern, determining a second pattern corresponding to a subsequently input first letter and a format of the second pattern according to the letter, and looking up the address book of the terminal in turn in accordance with the format of the second pattern to determine whether there is a matched contact person.

Wherein, the dial-up parsing module 16 is configured to display the contact person who satisfies the matching condition of the pattern information on a terminal interface by the following mode:

when there are a plurality of contact persons in the address book of the terminal who satisfy the matching condition of the pattern information, displaying the plurality of contact persons in turn on the terminal interface.

Furthermore, the dial-up parsing module 16 also comprises a fuzzy fault-tolerant processing function. In case of the input key information including a combination mode among a plurality of patterns, the input key information does not satisfy all the matching conditions of the pattern information. At this time, the fuzzy processing will be performed, only the contact persons who satisfy a matching condition of the pattern information will be intelligently displayed, and a correct dial mode for each contact person under the pattern will be reminded. That is, the user will be reminded of how to dial the number for the contact person under a corresponding pattern. For example, if it is a company pattern, a letter O should be input firstly, and then a two-digit abbreviation of the company name should be input.

Embodiment Two

Figure 2:
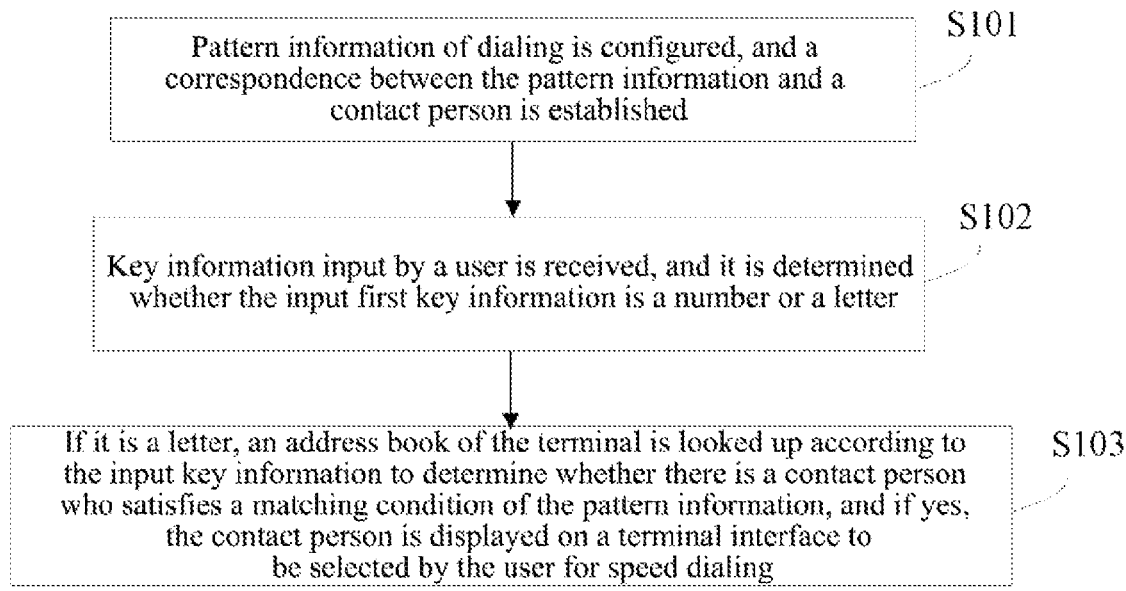
FIG. 2 is a flowchart of a method for speed dialing according to embodiment two of the present invention.

As shown in FIG. 2, the present embodiment provides a method for speed dialing, applied in a full keyboard terminal or an intelligent terminal. The keyboard of the terminal is a full keyboard. The full keyboard is a dial pad which can not only receive input of number keys, but also can receive input of letter keys. The method comprises the following steps.

In step S101, a terminal configures pattern information of dialing, and establishes a correspondence between the pattern information and a contact person.

In step S102, the terminal receives key information input by a user, and determines whether the input first key information is a number or a letter.

In step S103, if it is a letter, an address book of the terminal is looked up by the terminal according to the input key information to determine whether there is a contact person who satisfies a matching condition of the pattern information, and if yes, the contact person who satisfies the matching condition of the pattern information is displayed on a terminal interface to be selected by the user for speed dialing.

In step S101, the pattern information comprises a letter key corresponding to a pattern name, a format of a pattern, and a combination mode among a plurality of patterns;

in general, contact persons in an address book of the terminal comprise some attributes, for example, a company, a school, a birthday, and favorite sports etc., and these attributes are associated with the contact persons, and therefore, corresponding contact persons can be matched according to these attributes;

In the present embodiment, the pattern name is a contact person attribute, for example, the pattern name comprises the name of contact person, a company, a school, and a birthday etc., wherein, letter keys corresponding to the company, the school, and the birthday are O, S and B respectively.

The format of the pattern is the pattern name plus pattern content, and the number of digits occupied by the pattern name and content. For example, for a company pattern, the pattern name is a company, and the pattern content is an abbreviation of the company name. For example, for the Lenovo Company, the pattern content is LX, and the number of digits of the format of the pattern is set as 3, and a contact person with a contact person attribute being the company can be found in the address book of the terminal by inputting "OLX" in accordance with the company pattern.

The combination mode among the plurality of patterns comprises any combination among a company, a school, a birthday and the name of contact person, for example, a company plus the name of contact person, a birthday plus the name of contact person etc.

In step S102, if input first key information is a number, it illustrates that it is a traditional pure digital dial mode, and if the input first key information is a letter, it may be a dial mode of inputting a mixture of letters and numbers.

In step S103, during a specific implementation, the terminal determines a pattern corresponding to an input first letter and the format of the pattern according to the letter, and looks up the address book of the terminal in turn according to the input key information in accordance with the format of the pattern to determine whether there is a matched contact person.

Wherein, when there is a plurality of contact persons in the address book of the terminal who satisfy the matching condition of the pattern information, the plurality of contact persons are displayed by the terminal in turn to a user.

In addition, the present embodiment further comprises a fuzzy matching principle, that is, when the input key information comprises a combination mode among a plurality of patterns but contact persons in the address book of the terminal do not satisfy all the matching conditions of the pattern information, the terminal only displays contact persons who satisfy a matching condition of the pattern information.

In addition, when the input key information comprises a combination mode among a plurality of patterns, in step S103, during a specific implementation, the terminal determines a first pattern corresponding to an input first letter and a format of the first pattern according to the letter, and looks up an address book of the terminal in turn according to the input key information in accordance with the format of the first pattern to determine whether there is a matched contact person; and after determining that the key input of the first pattern ends according to the number of digits included in the format of the first pattern, the terminal determines a second pattern corresponding to a subsequently input first letter and a format of the second pattern according to the letter, and looks up the address book of the terminal in turn in accordance with the format of the second pattern to determine whether there is a matched contact person, and continues to look for subsequent modes in such way.

In the following, in an application example, a combination mode of "a company plus a contact person" is taken as an example. A correspondence has been established between a contact person attribute "company" and a contact person. Therefore, when the attribute is input by a user, the corresponding contact person can be matched. A technical scheme of the present embodiment will be described in detail.

First of all, a letter key corresponding to the company pattern is set as "O" ("O" is an abbreviation of Office, and the letter key corresponding to the combination pattern is better not to coincide with a letter key where a number key is located, so as to avoid a conflict with an ordinary dial mode, and therefore, "C" (an abbreviation of Company) is not used). As the key where C is located is also a key where the number key 8 is located, in order to avoid a conflict, the letter key corresponding to the company pattern is set as "O";

then, in accordance with the format of the pattern, subsequent two digits are an abbreviation of the company name. For example, an abbreviation corresponding to the Lenovo Company is LX (case Insensitive). The system will provide several combination modes by default. The user can directly utilize the several combination modes, or may also set the format of the pattern under each combination mode by himself or herself. For example, changing the default 2 digits of the system to 3 digits is feasible.

Next, a format of the pattern of the contact person is set as 3-digit abbreviation of the name. For example, if there is a contact person named as WangErXiao, the abbreviation of the name corresponding to WangErXiao is WRX. Generally, 3-digit abbreviation of the name has been applicable for all users, and it is not suggested to be modified; in addition, if there is a contact person named as DuGuQiuBai, which has four letter aberrations, the contact person can also be matched successfully by inputting DGQ by the user.

Assume that WangErXiao works in the Lenovo Company, when a call will be made to the contact person, it is only required to input olxwex. As 6 letters are input, and each letter has meaningful content, there is no need for the user to remember the content.

Of course, if a person named as WangErXian happens to be in the company, names of the two persons will be displayed in a pull-down list to be selected by the user for dialing.

In addition, if there is only one colleague of the Lenovo Company in the address book of the user, when the user inputs olx, the contact person has occurred in the pull-down interface, and there is no need for the user to input subsequent letters, and in such case, a call can be made to the contact person in the other party only by inputting 3 letters. That is, each input is matched with the contact persons in the address book, and 6 letters will be input only in a worst case.

In another application example, a combination mode of "a birthday plus a contact person" is taken as an example. A correspondence has been established between a contact person attribute "birthday" and a contact person. Therefore, when the attribute is input by a user, the corresponding contact person can be matched. A technical scheme of the present embodiment will be described in detail.

In this mode, a letter key corresponding to "birthday" is B (an abbreviation of Birthday);

Then, in accordance with the format of the pattern, it is followed by a 4-digit specific number of the birthday subsequently, which has a format of mmdd, and if the number of digits of the month is less than 2, zero is padded in the front of the month;

Next, the format of the pattern of the contact person is set as a 3-digit abbreviation of the name.

For example, a birthday of a friend is 4 May, with a name of ZhangSan. Generally, ZhangSan can be matched by inputting b0504zs. As described in the above application example, the input information is also matched and looked for in real time. Generally, there are a few opportunities that the birthday is on the same day. Therefore, when b0504 is input, ZhangSan should be matched. That is, the contact person can be found only by inputting 5 keys. If there happens to be a friend whose birthday is on the same day, contact persons whose birthday is on the same day will be displayed in the pull-down list to be selected, and the contact person will be matched by inputting zs subsequently.

Figure 3:
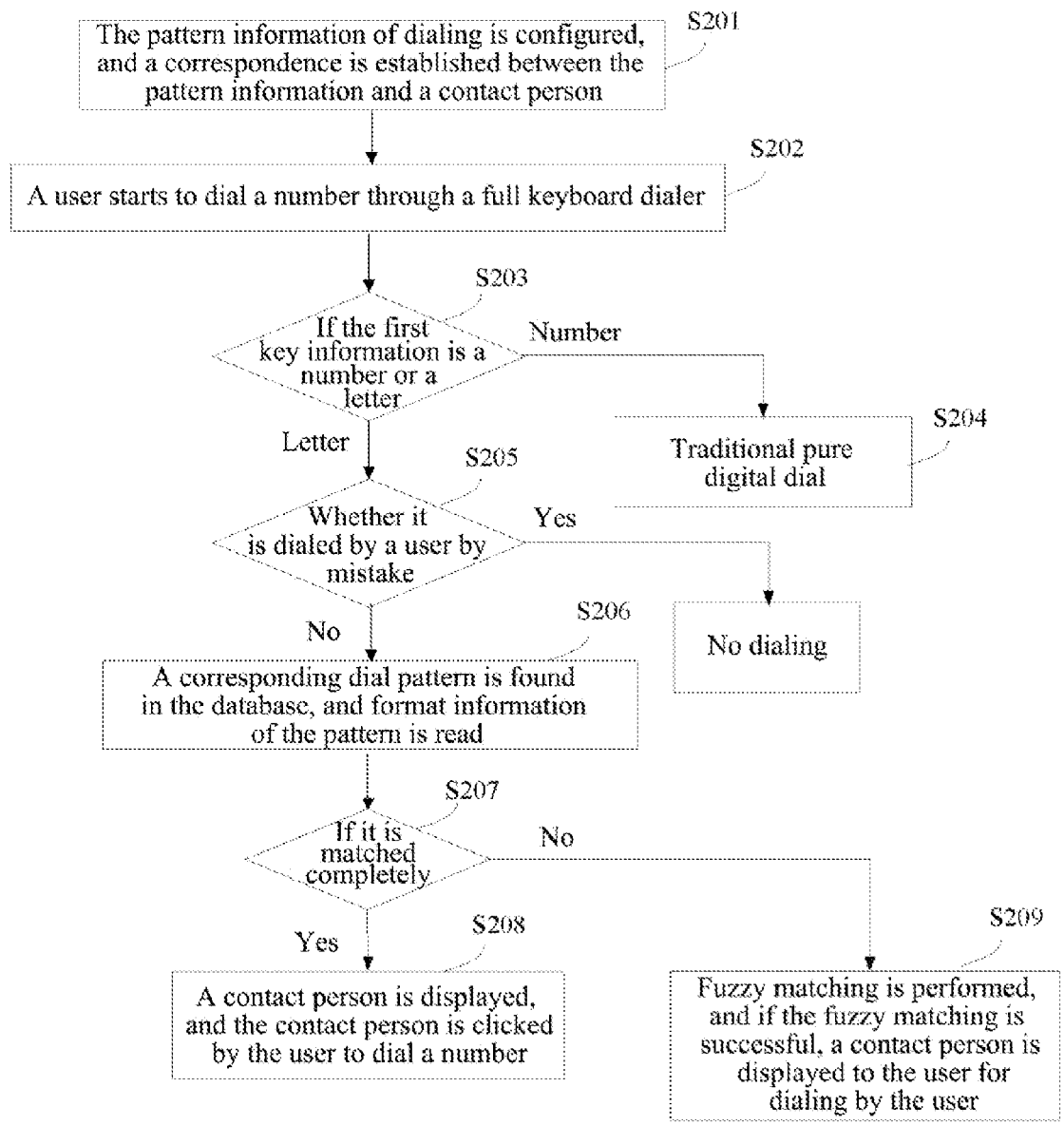
FIG. 3 is a flowchart of a method for speed dialing in an application example of the present invention.

In an application example, as shown in FIG. 3, a method for speed dialing comprises the following steps.

In step S201, the pattern information of dialing is configured, and a correspondence is established between the pattern information and a contact person.

The pattern information comprises a letter key corresponding to a pattern name, a format of a pattern, and a combination mode among a plurality of patterns. This information will be written into a database for storage.

In step S202, a user starts to dial a number through a full keyboard dialer.

In step 203, it is determined whether the input first key information is a number or a letter; and if it is a number, step S204 will be performed, and if it is a letter, step S205 will be performed.

In step S204, if input first key information is a number, it illustrates that a traditional pure digital dial mode is used currently, and the matching process will be performed in accordance with the traditional processing mode without being through a database.

As in the traditional dial mode, the input first content is a number directly, which input mode is used for dialing can be basically distinguished by determined whether the input first content is a letter or a number.

In step S205, if the input first key information is a letter, it also needs to determine whether it is dialed by a user by mistake, and if yes, the dialing will not be performed; and if no, step S206 will be performed.

As it may be dialed by the user by mistake, or a letter is input on the basis of other purposes, it also needs to further determine whether the dialing is performed in a mixture dialing mode.

When the first key information input by a user is a letter, whether there is a pattern corresponding to the letter is looked for in the database immediately, and if no, it illustrates that it is input by the user by mistake, and if yes, it illustrates that it is a dial mode of a mixture of letters and numbers.

In step S206, a dial pattern corresponding to the letter is found in the database, and format information of the pattern is read.

In step S207, it is determined whether the current content input by the user is matched completely, and if yes, step S208 will be performed; and if no, step S209 will be performed.

After the user inputs a first letter, content which is input subsequently each time will be matched in real time;

when the user only inputs a part of content, it is determined whether there is a contact person completely matched with the part of content; and if the user only inputs a part and there is no completely matched contact person, the matching does not stop actually at this time, since in the combination pattern, there are at least two conditions for locating a contact person by the user, and it may be the case that one condition is not satisfied while the other is satisfied. Therefore, when the user continues to input the content, the matching is performed in real time for another condition; in the combination pattern, when there is no contact person who is matched with the first condition, or when the first condition is satisfied, but there is no contact person who is matched with the second condition, the fuzzy matching will be performed by using the satisfied condition.

In step S208, a contact person is displayed, and the contact person is clicked by the user to dial a number.

In step S209, a fuzzy matching is performed, and if the fuzzy matching is successful, a contact person is displayed to the user for dialing by the user.

Wherein, the principle of the fuzzy matching is determining whether there is a contact person in the combination pattern who satisfies at least one condition but does not satisfy all conditions, and if yes, fuzzy matching will be performed.

If there is no contact person who satisfies any of the conditions, it is considered that the fuzzy matching fails, and the user is prompted that there is no matched contact person.

If in the combination pattern, the fuzzy matching is successful, or there is a contact person who is successfully matched with the current content input by the user, the contact persons will be displayed in the pull-down list. Particularly, during the display, for the case of successful fuzzy matching, in addition to the names of the contact persons, there will also be the correct dial mode of each contact person under the mixed dial pattern in the displayed content, so as to remind the user to some extent.

For the case that the input current content satisfies all conditions, there are only the names of the contact persons in the displayed content.

It can be seen from the above embodiments that, with above method and terminal for speed dialing according to the embodiments, it can save user's time and rapidly dial a call which a user needs to make by finding a matched contact person directly through key information input by the user, thereby improving the user experience.

A person having ordinary skill in the art can understand that all or a part of steps in the above method can be implemented by programs instructing related hardware, which can be stored in a computer readable storage medium, such as a read-only memory, a disk or a CD etc. Alternatively, all or a part of steps in the above embodiments can also be implemented by one or more integrated circuits. Accordingly, each module/unit in the above embodiments can be implemented in the form of hardware, or can also be implemented in the form of software functional module. The embodiments of the present invention are not limited to any particular form of a combination of hardware and software.

The above description is only the preferred embodiments of the present invention and is not intended to limit the protection scope of the patent document. According to the inventive content of the patent document, there may also be other multiple embodiments. Those of ordinary skill in the art can make various corresponding changes and variations according to the embodiments of the present invention without departing from the spirit and substance of the patent document. Any modification, equivalent substitution, improvement etc. which are made within the spirit and principle of the patent document should belong to the protection scope of the patent document.

INDUSTRIAL APPLICABILITY

With the method and terminal for speed dialing according to the embodiments of the present invention, it can save user's time and rapidly dial a call which a user needs to make by finding a matched contact person directly through key information input by the user, thereby improving the user experience.

What is claimed is:

1. A method for speed dialing, comprising:
a terminal configuring pattern information of dialing, and establishing a correspondence between the pattern information and a contact person, wherein the pattern information comprises a letter key corresponding to a pattern name, a format of a pattern, and a combination mode among a plurality of patterns;
the terminal receiving key information input by a user, and determining whether input first key information is a number or a letter; and if the first key information is a letter, looking up an address book of the terminal according to the input key information to determine whether there is a contact person who satisfies a matching condition of the pattern information, and if yes, displaying the contact person who satisfies the matching condition of the pattern information on a terminal interface to be selected by the user for speed dialing;
wherein,
the step of the terminal looking up an address book of the terminal according to the input key information to determine whether there is a contact person who satisfies a matching condition of the pattern information comprises;
the terminal determining a pattern corresponding to an input first letter and a format of the pattern according to the input first letter, and looking up the address book of the terminal in turn according to the input key information in accordance with the format of the pattern to determine whether there is a matched contact person;

when the input key information comprises a combination mode among two patterns, the terminal determining a first pattern corresponding to an input first letter and a format of the first pattern according to the input first letter, and looking up an address book of the terminal in turn according to the input key information in accordance with the format of the first pattern to determine whether there is a matched contact person; and after determining that a key input of the first pattern ends according to the number of digits included in the format of the first pattern, the terminal determining a second pattern corresponding to a subsequently input first letter and a format of the second pattern according to the subsequently input first letter, and looking up the address book of the terminal in turn in accordance with the format of the second pattern to determine whether there is a matched contact person.

2. The method according to claim 1, wherein,
the pattern name is a contact person attribute, and the pattern name corresponds to the letter key;
the format of the pattern is the pattern name plus pattern content, and the number of digits occupied by the pattern name and pattern content; and
the combination mode among the plurality of patterns comprises any combination among various contact person attribute patterns.

3. The method according to claim 1, wherein,
the step of the terminal displaying the contact person who satisfies the matching condition of the pattern information on a terminal interface comprises:
when there are a plurality of contact persons in the address book of the terminal who satisfy the matching condition of the pattern information, the terminal displaying the plurality of contact persons in turn on the terminal interface.

4. The method according to claim 1, wherein,
the step of the terminal displaying the contact person who satisfies the matching condition of the pattern information on a terminal interface comprises:
when the input key information comprises the combination mode among the plurality of patterns but contact persons in the address book of the terminal do not satisfy all the matching conditions of the pattern information, the terminal only displaying the contact persons who satisfy the matching condition of the pattern information on the terminal interface.

5. A terminal for speed dialing, comprising: a configuration module, a full keyboard dialer, and a dial-up parsing module, wherein,
the configuration module is configured to configure pattern information of dialing, and establish a correspondence between the pattern information and a contact person, wherein the pattern information comprises a letter key corresponding to a pattern name, a format of a pattern, and a combination mode among a plurality of patterns;
the full keyboard dialer is configured to receive key information input by a user, and transmit the key information to the dial-up parsing module; and
the dial-up parsing module is configured to determine whether input first key information is a number or a letter after receiving the key information transmitted by the full keyboard dialer;
and if the first key information is a letter, look up an address book of the terminal according to the input key information to determine whether there is a contact person who satisfies a matching condition of the pattern information, and if yes, display the contact person who satisfies the matching condition of the pattern information on a terminal interface to be selected by the user for speed dialing;

wherein,
the dial-up parsing module is configured to look up the address book of the terminal according to the input key information to determine whether there is a contact person who satisfies the matching condition of the pattern information by a following mode;
determining a pattern corresponding to an input first letter and a format of the pattern according to the input first letter, and looking up the address book of the terminal in turn according to the input key information in accordance with the format of the pattern to determine whether there is a matched contact person;
when the key information comprises a combination mode among two patterns, determining a first pattern corresponding to an input first letter and a format of the first pattern according to the input first letter, and looking up the address book of the terminal in turn according to the input key information in accordance with the format of the first pattern to determine whether there is a matched contact person; and after determining that a key input of the first pattern ends according to the number of digits included in the format of the first pattern, determining a second pattern corresponding to a subsequently input first letter and a format of the second pattern according to the subsequently input first letter, and looking up the address book of the terminal in turn in accordance with the format of the second pattern to determine whether there is a matched contact person.

6. The terminal according to claim 5, wherein,
the pattern name is a contact person attribute, and the pattern name corresponds to the letter key;
the format of the pattern is the pattern name plus pattern content, and the number of digits occupied by the pattern name and pattern content; and
the combination mode among the plurality of patterns comprises any combination among various contact person attribute patterns.

7. The terminal according to claim 5, wherein,
the dial-up parsing module is configured to display the contact person who satisfies the matching condition of the pattern information on the terminal interface by a following mode:
when there are a plurality of contact persons in the address book of the terminal who satisfy the matching condition of the pattern information, displaying the plurality of contact persons in turn on the terminal interface.

8. The terminal according to claim 5, wherein,
the dial-up parsing module is configured to display the contact person who satisfies the matching condition of the pattern information on the terminal interface by a following mode:
when the input key information comprises the combination mode among the plurality of patterns but contact persons in the address book of the terminal do not satisfy all the matching conditions of the pattern information, only displaying the contact persons who satisfy the matching condition of the pattern information on the terminal interface.

* * * * *